(12) United States Patent
Matsumoto (10) Patent No.: US 10,221,868 B2
(45) Date of Patent: Mar. 5, 2019

(54) INTERMITTENT AIR DISCHARGE APPARATUS

(71) Applicant: Koganei Corporation, Koganei-shi, Tokyo (JP)

(72) Inventor: Keisuke Matsumoto, Koganei (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 15/535,139

(22) PCT Filed: Aug. 6, 2015

(86) PCT No.: PCT/JP2015/072357
§ 371 (c)(1),
(2) Date: Jun. 12, 2017

(87) PCT Pub. No.: WO2016/098380
PCT Pub. Date: Jun. 23, 2016

(65) Prior Publication Data
US 2017/0343020 A1     Nov. 30, 2017

(30) Foreign Application Priority Data
Dec. 17, 2014  (JP) ................................ 2014-254721

(51) Int. Cl.
| F15B 11/06 | (2006.01) |
| F16K 31/122 | (2006.01) |
| F15B 11/00 | (2006.01) |

(52) U.S. Cl.
CPC .............. *F15B 11/06* (2013.01); *F15B 11/00* (2013.01); *F16K 31/122* (2013.01)

(58) Field of Classification Search
CPC ......... F16B 11/00; F16B 11/06; F16K 31/122
(Continued)

(56) References Cited

U.S. PATENT DOCUMENTS 5,047,965 A * 9/1991 Zlokovitz .......... G05D 16/2093
                                                            137/487
5,927,329 A    7/1999 Yie
(Continued)

FOREIGN PATENT DOCUMENTS

| JP | H07-190221 A | 7/1995 |
| WO | 2014-080664 A1 | 5/2014 |

OTHER PUBLICATIONS

International Search Report for PCT Serial No. PCT/JP2015/072357 dated Oct. 27, 2015.

*Primary Examiner* — Eric Keasel
(74) *Attorney, Agent, or Firm* — McCormick, Paulding & Huber LLP (57) ABSTRACT

An intermittent air discharge apparatus has a main valve and a pilot valve, the main valve being switched between a discharge state and a discharge stop state. The pilot valve is switched between an air-supply state to supply air to a pilot chamber for air-discharge, and an air-supply stop state. When the pilot valve is switched to the air-supply state, an exhaust passage communicates with the pilot chamber for air-discharge. When the pilot valve is switched to the air-supply state, a supply or exhaust passage allows an air supply passage to communicate with the pilot chamber for air-discharge and a pilot chamber for stopping air-supply; when the pilot valve is switched to the air-supply stop state, communication with the air supply passage is blocked. A flow rate of air from the pilot chamber for air-discharge is set by the exhaust passage, and a flow rate of air from the pilot chamber for stopping air-supply is set by the supply or exhaust passage.

11 Claims, 9 Drawing Sheets

(58) Field of Classification Search
USPC .................................................. 137/488, 492
See application file for complete search history.

(56) References Cited

U.S. PATENT DOCUMENTS

| | | | | |
|---|---|---|---|---|
| 6,095,184 A * | 8/2000 | Neff | ....................... | G05D 16/16 |
| | | | | 137/488 |
| 6,584,999 B2 * | 7/2003 | Inayama | ............ | G05D 16/2093 |
| | | | | 137/488 |
| 7,147,430 B2 * | 12/2006 | Wiggins | ................ | F01D 17/145 |
| | | | | 137/488 |
| 7,735,518 B2 * | 6/2010 | Williams | ............ | F15B 13/0402 |
| | | | | 137/596.15 |
| 8,286,661 B2 * | 10/2012 | Krake | ................ | F16K 31/1245 |
| | | | | 137/488 |
| 8,413,677 B1 * | 4/2013 | Coffman | ............... | F15B 13/024 |
| | | | | 137/488 |
| 9,353,771 B2 * | 5/2016 | Studer | ................. | F15B 13/0426 |
| 2012/0241012 A1 * | 9/2012 | Studer | ................. | F15B 13/0426 |
| | | | | 137/1 |

* cited by examiner

INTERMITTENT AIR DISCHARGE APPARATUS

CROSS-REFERENCE TO RELATED APPLICATIONS

This application is a National Stage application of International Patent Application No. PCT/JP2015/072357, filed on Aug. 6, 2015, which claims priority to Japanese Patent Application No. 2014-254721, filed on Dec. 17, 2014, each of which is hereby incorporated by reference in its entirety.

TECHNICAL FIELD

The present invention relates to an intermittent air discharge apparatus which intermittently discharges compressed air to an object.

BACKGROUND ART

An intermittent air discharge apparatus is utilized to intermittently discharge compressed air to various objects. The intermittent air discharge apparatus intermittently, or pulsatively, discharges compressed air, which is supplied from a fluid supply source to the intermittent air discharge apparatus through a supply pipeline. When the supply pipeline is provided with a solenoid valve operated to open and close a passage, and open/close actions of the solenoid valve are controlled by a timer, the solenoid valve and timer need to be supplied with power.

As described in International Publication No. WO 2014/080664, a pilot-operated directional valve having a main valve which is operated to open and close a passage and a pilot valve which is used to operate the main valve may be utilized instead of the solenoid valve, whereby air can be intermittently discharged without supplying any power.

SUMMARY

An intermittent air discharge apparatus described in Patent Document 1 includes a supply/exhaust pilot chamber. When a main valve is switched to a discharge position by internal pressure of the supply/exhaust pilot chamber, air accumulated in the supply/exhaust pilot chamber is discharged through a discharge passage. A flow rate of air discharged through the discharge passage, therefore, depends on the capacity of the supply/exhaust pilot chamber. Thus, the flow rate of air discharged by a single intermittent air discharge apparatus cannot be changed, and increasing the flow rate, in particular, is difficult.

An object of the present invention is to provide an intermittent air discharge apparatus capable of adjusting the flow rate of air discharged through a discharge passage.

According to one aspect of the present invention, an intermittent air discharge apparatus which intermittently discharges supplied compressed air comprises: a main valve provided with a pilot chamber for air-discharge, the main valve being operated to be switched between: a discharge state to allow an air supply port supplied with compressed air to communicate with a discharge port through which compressed air is discharged; and a discharge stop state to block the air supply port and the discharge port from communicating with each other; a pilot valve provided with a pilot chamber for stopping air-supply, the pilot valve being operated to be switched between: an air-supply state to allow compressed air to be supplied from the air supply port to the pilot chamber for air-discharge, and an air-supply stop state to stop compressed air from being supplied to the pilot chamber for air-discharge; an exhaust passage which communicates with the pilot chamber for air-discharge when the pilot valve is switched to the air-supply stop state; and a supply or exhaust passage which allows the air supply port to communicate with the pilot chamber for stopping air-supply when the pilot valve is switched to the air-supply state, and allows the pilot chamber for stopping air-supply to communicate with the exhaust passage when the pilot valve is switched to the air-supply stop state.

The intermittent air discharge apparatus of the present invention includes the main valve and the pilot valve. The main valve is operated to be switched between: the discharge state to allow the air supply port through which compressed air is supplied from a fluid supply source to communicate with the discharge port through which compressed air is discharged; and the discharge stop state to block the ports from communicating with each other. The pilot valve is operated to be switched between the air-supply state to allow compressed air to be supplied to the pilot chamber for air-discharge of the main valve, and the air-supply stop state to stop compressed air from being supplied to the pilot chamber for air-discharge, thereby controlling operations of the main valve. Compressed air from the fluid supply source is discharged directly through the discharge port, and for this reason, a main valve capable of adjusting a flow rate of air discharged, that is, a main valve with an appropriate size, can be selected. In addition, by changing pressure of the compressed air to be supplied to the air supply port, compressed air with desired pressure can be discharged.

When the pilot valve is switched to the air-supply stop state, air is exhausted from the pilot chamber for air-discharge of the main valve through the exhaust passage, and compressed air is exhausted from the pilot chamber for stopping air-supply of the pilot valve through the exhaust passage and the supply or exhaust passage. A discharge period, in which air is discharged through the discharge port, is determined by a flow rate of air exhausted from the pilot chamber for air-discharge to the outside through the exhaust passage. A discharge-stop period, in which air discharge through the discharge port is stopped, is determined by a flow rate of air exhausted from the pilot chamber for stopping air-supply to the outside through the exhaust passage and the supply or exhaust passage. The discharge period and the discharge-stop period are automatically and alternately repeated, and therefore, compressed air is intermittently discharged through the discharge port.

DETAILED DESCRIPTION

Figure 1:
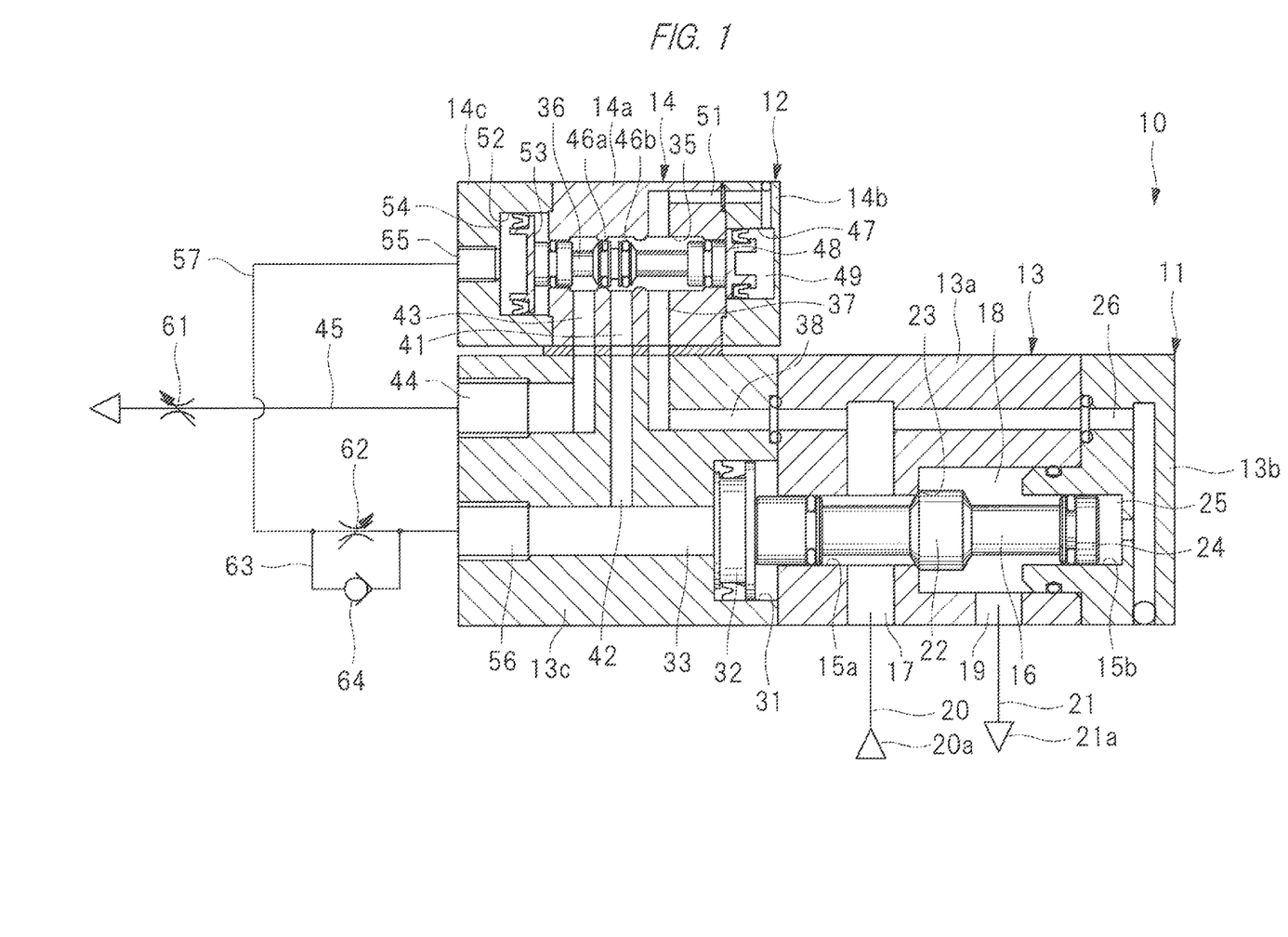
FIG. 1 is a cross-sectional view showing an intermittent air discharge apparatus according to one embodiment of the present invention.
Figure 2:
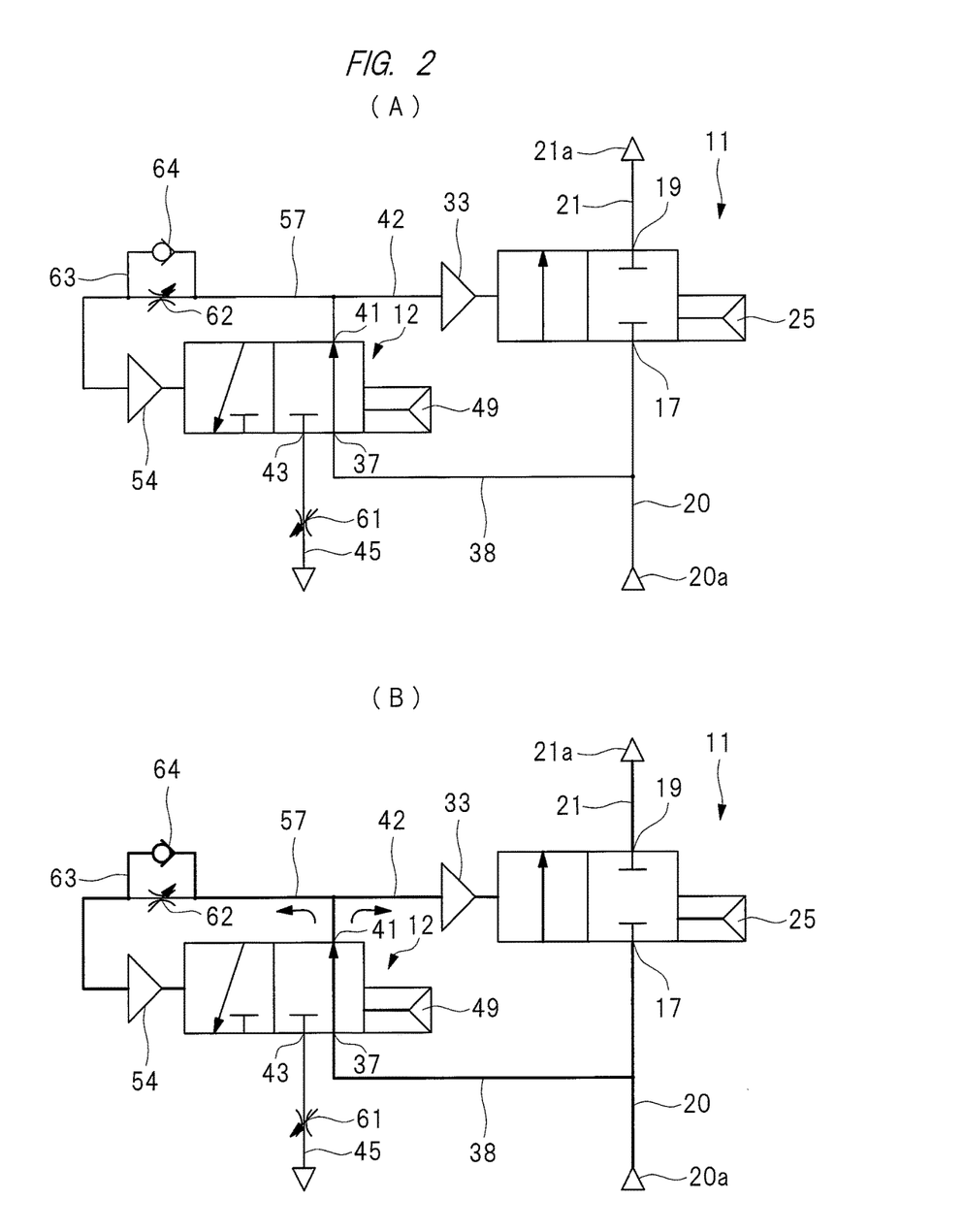
FIG. 2(A) is a pneumatic circuit diagram of the intermittent air discharge apparatus of FIG. 1.
FIG. 2(B) is a pneumatic circuit diagram showing the intermittent air discharge apparatus of FIG. 1 at the start of air discharge.

Hereinafter, embodiments of the present invention will be described in detail on the basis of the drawings. As shown in FIG. 1, an intermittent air discharge apparatus 10 comprises a main valve 11 and a pilot valve 12. The main valve 11 has a valve housing assembly 13, the pilot valve 12 has a valve housing assembly 14, and the valve housing assembly 13 is connected to the valve housing assembly 14, as shown in FIG. 1.

The valve housing assembly 13 has a body block 13a and a pilot block 13b, a valve hole 15a is formed in the body block 13a, and a valve hole 15b is formed in the pilot block 13b. A valve shaft 16 is fitted in the valve holes 15a and 15b and is reciprocatively movable in an axial direction of the valve shaft 16. The body block 13a is provided with an air supply port 17 and a valve chamber 18 which both communicate with the valve hole 15a. The body block 13a is provided with a discharge port 19 which communicates with the valve chamber 18. The air supply port 17 is connected to an air supply passage 20, so that compressed air is supplied from a fluid supply source 20a to the air supply port 17 through the air supply passage 20. An air-discharge member 21a is provided with a discharge passage 21 which is connected to the discharge port 19, so that air flows through the discharge passage 21 and is discharged to an air-discharge member 21a.

The valve shaft 16 is provided with a valve element 22. The body block 13a is provided with a valve seat 23 which abuts on the valve element 22, and the main valve 11 is a poppet-type valve. When the valve element 22 is moved away from the valve seat 23 and the main valve 11 is switched to a discharge state, the air supply port 17 communicates with the discharge port 19. As a result, air supplied from the fluid supply source 20a is discharged through the discharge port 19. On the other hand, when the valve element 22 abuts on the valve seat 23 and the main valve 11 is switched to a discharge stop state, the air supply port 17 and the discharge port 19 are blocked from communicating with each other, and the discharge port 19 is closed. In this manner, air is stopped from being discharged through the discharge port 19. Therefore, when the main valve 11 is alternately switched between the discharge state and the discharge stop state, compressed air supplied from the fluid supply source 20a to the air supply port 17 flows through the discharge port 19 and is intermittently discharged to the air-discharge member 21a.

A piston 24 for stopping air-discharge is fitted in the valve hole 15b of the valve housing assembly 13, and is reciprocatively movable. The piston 24 for stopping air-discharge is disposed on one end side of the valve shaft 16. The piston 24 for stopping air-discharge partitions a pilot chamber 25 for stopping air-discharge in the pilot block 13b. The pilot chamber 25 for stopping air-discharge communicates with the air supply port 17 through a pilot passage 26. Because of this structure, when compressed air is supplied to the air supply port 17, a thrust for moving the valve shaft 16 toward a discharge-stop position is applied to the valve shaft 16.

The valve housing assembly 13 has a pilot block 13c which is provided with a piston housing hole 31. A piston 32 for air-discharge is fitted in the piston housing hole 31, is reciprocatively movable in an axial direction of the piston 32, and abuts on the other end face of the valve shaft 16. The piston 32 for air-discharge partitions a pilot chamber 33 for air-discharge in the pilot block 13c.

The piston 32 for air-discharge has an outer diameter greater than that of the piston 24 for stopping air-discharge, and the pilot chamber 33 for air-discharge has an inner diameter greater than that of the pilot chamber 25 for stopping air-discharge. Therefore, when compressed air supplied to the air supply port 17 is further supplied to both pilot chambers, a thrust applied by the piston 32 for air-discharge to move the valve element 22 away from the valve seat 23 becomes greater than a thrust applied by the piston 24 for stopping air-discharge to move the valve element 22 toward the valve seat 23. As a result, the valve element 22 is moved away from the valve seat 23, and the main valve 11 is switched to the discharge state. On the other hand, when compressed air is stopped from being supplied to the pilot chamber 33 for air-discharge, a thrust for moving the valve element 22 toward the valve seat 23 is applied to the valve shaft 16 by compressed air supplied to the piston 24 for stopping air-discharge. As a result, the valve element 22 abuts on the valve seat 23, and the main valve 11 is switched to the discharge stop state.

The valve housing assembly 14 of the pilot valve 12 has a body block 14a and pilot blocks 14b and 14c, the body block 14a has end faces to which the pilot blocks 14b and 14c are respectively attached, and the pilot valve 12 is attached to the pilot block 13c of the main valve 11. The body block 14a is provided with a valve hole 35 in which a valve shaft 36 is fitted, and the valve shaft 36 is reciprocatively movable in an axial direction of the valve shaft 36. The body block 14a is further provided with an air supply port 37 which communicates with the air supply port 17 of the main valve 11 through a passage 38. Compressed air supplied to the air supply port 17 is, therefore, further supplied to the air supply port 37.

The body block 14a is provided with an output port 41 which communicates with the pilot chamber 33 of the main valve 11 through a pilot passage 42. The body block 14a is further provided with an exhaust port 43, the pilot block 13c is provided with an exhaust hole 44, and the exhaust port 43 communicates with the exhaust hole 44. The air supply port 37, the output port 41, and the exhaust port 43 extend to the valve hole 35 and are positioned apart from each other, the output port 41 being provided between the air supply port 37 and the exhaust port 43. The exhaust hole 44 communicates with an exhaust passage 45, so that air exhausted from the exhaust port 43 is further exhausted to the outside by flowing through the exhaust passage 45.

The valve shaft 36 is provided with valve elements 46a and 46b, and the pilot valve 12 is a spool-type valve. As shown in FIG. 1, when the valve shaft 36 is driven so that the valve element 46a blocks communication between the output port 41 and the exhaust port 43, the output port 41 communicates with the air supply port 37, and the pilot valve 12 is switched to an air-supply state. When the pilot valve 12 is switched to the air-supply state, compressed air from the fluid supply source 20a is supplied to the pilot chamber 33 for air-discharge of the main valve 11. On the other hand, when the valve shaft 36 is driven so that the valve element 46b blocks communication between the air supply port 37 and the output port 41, compressed air is stopped from being supplied to the pilot chamber 33 for air-discharge. At this time, the output port 41 communicates with the exhaust port 43, the pilot chamber 33 for air-discharge communicates with the exhaust passage 45 through the pilot valve 12, and air in the pilot chamber 33 for air-discharge is exhausted to the outside through the exhaust passage 45.

The pilot block 14b of the pilot valve 12 is provided with a piston housing hole 47 in which a piston 48 for air-supply is fitted; the piston 48 for air-supply is reciprocatively movable in an axial direction of the piston housing hole 47, and abuts on one end face of the valve shaft 36. The piston 48 for air-supply partitions a pilot chamber 49 for air-supply in the pilot block 14b. The pilot chamber 49 for air-supply communicates with the air supply port 37 through a pilot passage 51. Because of this structure, when compressed air is supplied to the air supply port 37, a thrust for moving the valve shaft 36 toward an air-supply position is applied to the valve shaft 36 by compressed air supplied to the pilot chamber 49 for air-supply.

The pilot block 14c of the pilot valve 12 is provided with a piston housing hole 52. An exhaust piston 53 is fitted in the piston housing hole 52, is reciprocatively movable in an axial direction of the exhaust piston 53, and abuts on the other end face of the valve shaft 36. The exhaust piston 53 partitions a pilot chamber 54 for stopping air-supply in the pilot block 14c. When compressed air is supplied to the pilot chamber 54 for stopping air-supply, a thrust for moving the valve shaft 36 toward an air supply-stop position is applied to the valve shaft 36 by the compressed air supplied to the pilot chamber 54 for stopping air-supply.

The exhaust piston 53 has an outer diameter greater than that of the piston 48 for air-supply, and the pilot chamber 54 for stopping air-supply has an inner diameter greater than that of the pilot chamber 49 for air-supply. Therefore, when compressed air supplied to the air supply port 37 is further supplied to both pilot chambers, a thrust for moving the valve shaft 36 toward an air-exhaust position becomes greater than the thrust for moving the valve shaft 36 toward the air-supply position. The pilot valve 12 is thus switched to an air-supply stop state. On the other hand, when compressed air is stopped from being supplied to the pilot chamber 54 for stopping air-supply, the valve element 46a is moved to close the exhaust port 43 by compressed air supplied to the piston 48 for air-supply. The pilot valve 12 is thus switched to the air-supply state.

The pilot block 14c of the valve housing assembly 14 is provided with a pilot port 55 which communicates with the pilot chamber 54 for stopping air-supply. The pilot block 13c is provided with a pilot port 56 which communicates with the pilot passage 42. A supply or exhaust passage 57 is provided between pilot ports 55 and 56 and is connected to both pilot ports 55 and 56. The supply or exhaust passage 57 communicates with the pilot chamber 33 for air-discharge and the output port 41 through the pilot passage 42. Therefore, when the pilot valve 12 is switched to the air-supply state as shown in FIG. 1, the supply or exhaust passage 57 allows the pilot chamber 54 for stopping air-supply to communicate with the fluid supply source 20a. As a result, compressed air is supplied from the fluid supply source 20a to the pilot chamber 54 for stopping air-supply through the pilot valve 12.

As air is supplied to the pilot chamber 54 for stopping air-supply, the pilot valve 12 is switched to the air-supply stop state. In this state, the air supply port 37 and the output port 41 are blocked from communicating with each other, and the output port 41 communicates with the exhaust port 43. When the output port 41 communicates with the exhaust port 43, the pilot chamber 54 for stopping air-supply communicates with the exhaust passage 45 through the supply or exhaust passage 57, the pilot passage 42, the output port 41, and the exhaust port 43.

The exhaust passage 45 is provided with a first variable throttle valve 61 which is a first throttle valve. The first variable throttle valve 61 is operated to set a flow rate of air, that is, a speed of flowing air when air in the pilot chamber 33 for air-discharge is exhausted to the outside through the exhaust passage 45. Air in the pilot chamber 33 for air-discharge is exhausted to the outside through the exhaust passage 45 when the pilot valve 12 is switched to the air-supply stop state. The flow rate of air flowing through the exhaust passage 45 can be changed by adjusting the first variable throttle valve 61.

The supply or exhaust passage 57 is provided with a second variable throttle valve 62 which is a second throttle valve. The second variable throttle valve 62 is operated to set a flow rate of air when air in the pilot chamber 54 for stopping air-supply is exhausted to the outside through the supply or exhaust passage 57, the pilot passage 42, the output port 41, the exhaust port 43, and the exhaust passage 45. Because air in the pilot chamber 54 for stopping air-supply to the outside through the supply or exhaust passage 57 and the exhaust passage 45, the flow rate of air exhausted from the pilot chamber 54 for stopping air-supply varies according to the first variable throttle valve 61 and the second variable throttle valve 62. By replacing the variable throttle valves 61 and 62 with throttle valves having a fixed opening angle, or by setting an opening cross-section of a passage to a specific value, a period for exhausting air can be set to a fixed value.

The supply or exhaust passage 57 is provided with a bypass passage 63 which passes around the second variable throttle valve 62, and the bypass passage 63 is provided with a check valve 64. The check valve 64 is operated to open the bypass passage 63 when compressed air is supplied from the fluid supply source 20a to the pilot chamber 54 for stopping air-supply through the supply or exhaust passage 57. The check valve 64 is operated to close the bypass passage 63 when a flow direction of the compressed air in the bypass passage 63 is reversed from the above-mentioned flow direction, that is, when compressed air is exhausted from the pilot chamber 54 for stopping air-supply. Therefore, when compressed air in the pilot chamber 54 for stopping air-supply is exhausted, the compressed air flows to the second variable throttle valve 62.

FIG. 1 shows the intermittent air discharge apparatus 10 with the pilot valve 12 attached to the main valve 11. However, another embodiment may have a pilot valve 12 separated from a main valve 11, and instead the pilot valve 12 may communicate with the main valve 11 through a passage. Variable throttle valves 61 and 62 may be incorporated in a pilot block 13c in another embodiment.

Figure 3:
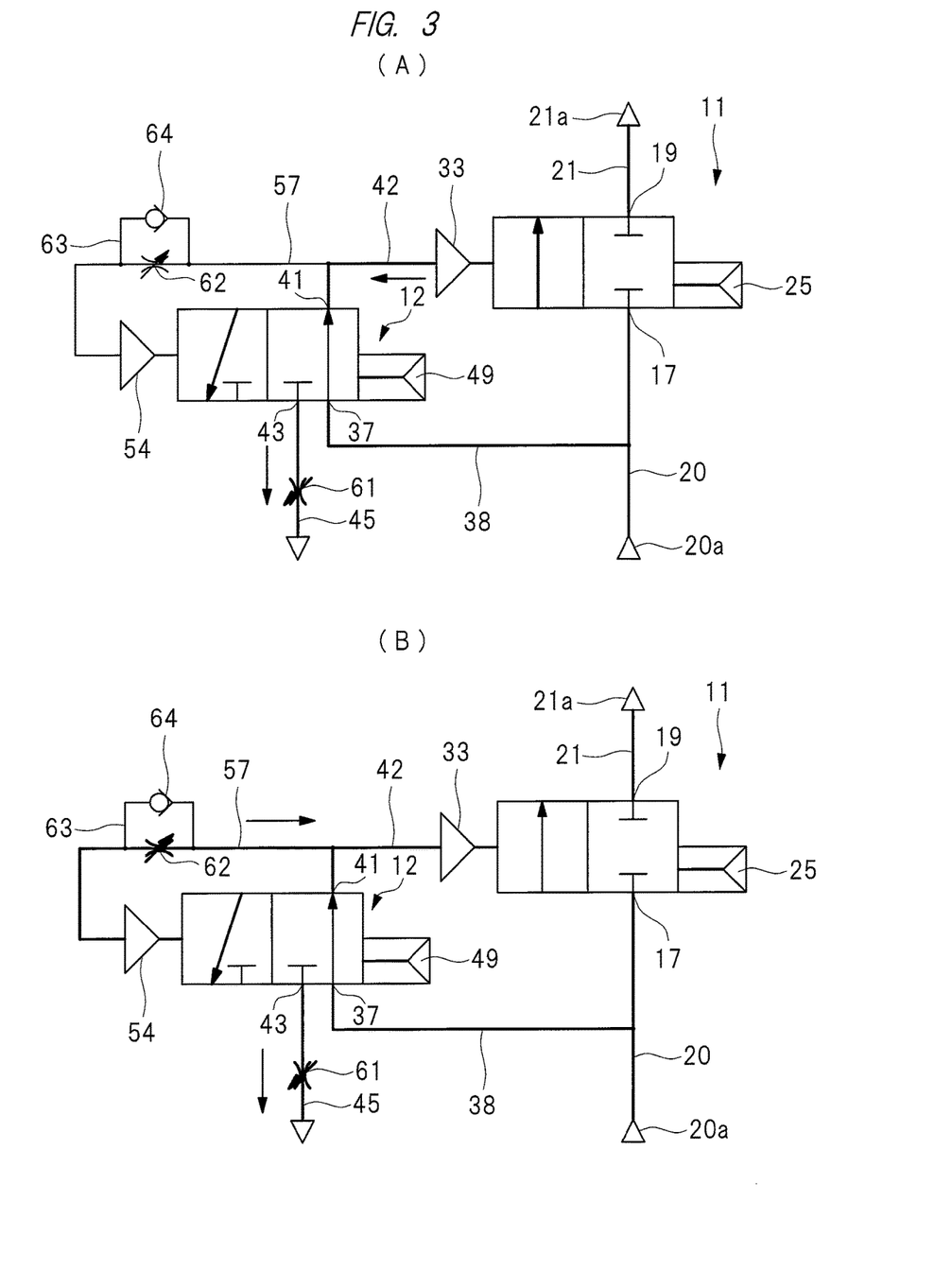
FIG. 3(A) is a pneumatic circuit diagram showing the intermittent air discharge apparatus of FIG. 1 with air discharged.
FIG. 3(B) is a pneumatic circuit diagram showing the intermittent air discharge apparatus of FIG. 1 with air discharge stopped.
Figure 4:
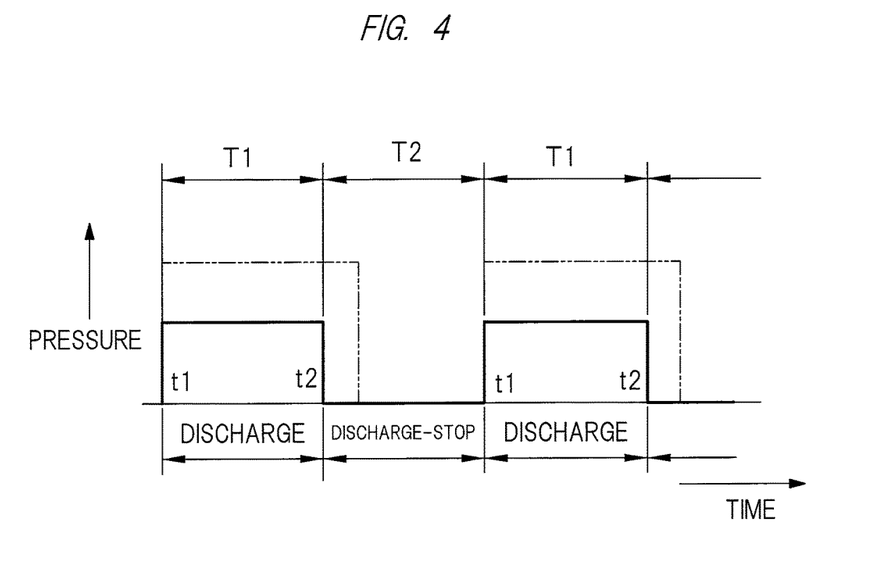
FIG. 4 is a switching-operation characteristics diagram showing a waveform of air discharge for the intermittent air discharge apparatus.

FIGS. 2(A) to 3(B) are pneumatic circuit diagrams of the above-mentioned intermittent air discharge apparatus. FIG. 2(B) shows the intermittent air discharge apparatus at the start of air discharge, FIG. 3(A) shows the intermittent air discharge apparatus with air discharged, and FIG. 3(B) shows the intermittent air discharge apparatus with air discharge stopped. In FIGS. 2(A) to 3(B), components the same as those shown in FIG. 1 are referred to by identical reference numerals. As shown in FIGS. 2(B), 3(A), and 3(B), flow directions of air are indicated by thick lines. FIG. 4 is a time chart showing a waveform of air pulsatively discharged from the air-discharge member 21a.

When compressed air is supplied from the fluid supply source 20a to the air supply port 17, compressed air is supplied to the pilot chamber 25 for stopping air-discharge and the pilot chamber 49 for air-supply. As compressed air is supplied to the pilot chamber 49 for air-supply, air is supplied to the pilot chamber 33 for air-discharge through the pilot valve 12 set to its air-supply position, and the main valve 11 is switched to the discharge state. Compressed air thus flows through the discharge passage 21 and is discharged, as shown in FIG. 2(B) in which flow directions are indicated by thick lines. In FIG. 4, "t1" indicates a point of time at which the main valve 11 is switched to the discharge state as shown in FIG. 2(B).

As air is discharged through the discharge passage 21, air is supplied to the pilot chamber 54 for stopping air-supply through the bypass passage 63 of the supply or exhaust passage 57, and the pilot valve 12 is switched to the air-supply stop state. Discharging of air through the discharge passage 21 is started approximately at the same time the pilot valve 12 is switched to the air-supply stop state. In this state, compressed air from the fluid supply source 20a is stopped from being supplied to the pilot chamber 33 for air-discharge, the pilot chamber 33 for air-discharge communicates with the exhaust passage 45 through the pilot valve 12, and compressed air is exhausted from the pilot chamber 33 for air-discharge. FIG. 3(A) shows the intermittent air discharge apparatus 10 exhausting compressed air from the pilot chamber 33 for air-discharge to the outside through the exhaust passage 45. A period in which compressed air is exhausted from the pilot chamber 33 for air-discharge corresponds to a period "T1" in which compressed air is discharged through the discharge passage 21, as shown in FIG. 4. The period "T1" is determined by the flow rate of air exhausted through the exhaust passage 45, wherein this flow rate of air is set by the first variable throttle valve 61.

As air in the pilot chamber 33 for air-discharge is exhausted, the main valve 11 is switched to the discharge stop state by air in the pilot chamber 25 for stopping air-discharge, as shown in FIG. 3(B). As a result, the discharge passage 21 and the air supply passage 20 are blocked from communicating with each other, and air is stopped from being discharged through the discharge passage 21. "t2" in FIG. 4 indicates a point of time at which compressed air is stopped from being discharged through the discharge passage 21.

In this manner, air is exhausted from the pilot chamber 33 for air-discharge, the main valve 11 is switched to the discharge stop state, and the pilot valve 12 is switched from the air-supply stop state to the air-supply state. When the pilot valve 12 is switched to the air-supply stop state, a pressure change in the pilot chamber 33 of the main valve 11 and a pressure change in the pilot chamber 54 of the pilot valve 12 occur in the following manner. The pilot chamber 54 for stopping air-supply is located at an upstream side relative to a passage composed of the supply or exhaust passage 57 and the exhaust passage 45 connected in series with each other. Compressed air is exhausted from the pilot chamber 54 for stopping air-supply to the outside through the passage composed of the supply or exhaust passage 57 and the exhaust passage 45 connected in series with each other. The pilot chamber 33 for air-discharge, on the other hand, is located at a downstream side relative to the pilot chamber 54 for stopping air-supply, and air is exhausted from the pilot chamber 33 for air-discharge to the outside only through the exhaust passage 45. In other words, air pressure in the pilot chamber 54 for stopping air-supply located at the upstream side is always higher than air pressure in the pilot chamber 33 for air-discharge located at the downstream side. Therefore, internal pressure in the pilot chamber 33 for air-discharge drops first, and internal pressure in the pilot chamber 54 for stopping air-supply drops afterwards. This means that the main valve 11 is switched to the discharge stop state first, and shortly afterward, the pilot valve 12 is switched to the air-supply state.

A period in which compressed air is exhausted from the pilot chamber 54 for stopping air-supply corresponds to a discharge-stop period "T2" shown in FIG. 4. The discharge-stop period "T2" is determined by the flow rate of air exhausted from the pilot chamber 54 for stopping air-supply to the outside through the supply or exhaust passage 57, the pilot passage 42, the output port 41, the exhaust port 43, and the exhaust passage 45, wherein this flow rate of air is set by the variable throttle valves 61 and 62. As air is exhausted from the pilot chamber 54 for stopping air-supply, the pilot valve 12 is switched to the air-supply state by compressed air in the pilot chamber 49 for air-supply. After the pilot valve 12 is switched to the air-supply state, the main valve 11 is switched to the discharge state, as shown in FIG. 2(B).

In this manner, periods in which compressed air is discharged and periods in which compressed air is stopped from being discharged are alternately repeated, resulting in intermittent discharging of compressed air through the discharge passage 21; hence, the discharged compressed air has a pulse-shaped waveform. When a single periodic time "T" consists of the discharge period "T1" and the discharge-stop period "T2", a ratio of the compressed air discharge period to the single periodic time "T", that is, a duty ratio "D", is defined as T1/T. The duty ratio "D" is determined by the flow rate of compressed air exhausted from the pilot chamber 54 for stopping air-supply, wherein this flow rate of compressed air is set by the second variable throttle valve 62. By adjusting the second variable throttle valve 62, therefore, the duty ratio "D" can be changed to any desired value. A frequency "F" of pulsatively discharged compressed air, defined as 1/T, is determined by the flow rate of compressed air exhausted through the exhaust passage 45, wherein this flow rate of compressed air is set by the first variable throttle valve 61.

By adjusting the two variable throttle valves 61 and 62, therefore, the frequency "F" and the duty ratio "D" of compressed air pulsatively discharged through the air-discharge member 21a can be changed to desired values. These variable throttle valves may be replaced with throttle valves having a fixed opening angle when values of the frequency "F" and the duty ratio "D" are to be constant.

Since the air-discharge member 21a is designed to discharge compressed air from the fluid supply source 20a, pressure of discharging air can be increased or reduced by adjusting pressure of air supplied from the fluid supply source 20a, as indicated by a two-dot chain line shown in FIG. 4. This allows a single intermittent air discharge apparatus 10 to pulsatively send air to various objects. The two-dot chain line shown in FIG. 4 indicate a case where the duty ratio "D" is set by the throttle valve to a value which differs from the duty ratio "D" indicated by a continuous line as shown in FIG. 4.

Figure 5:
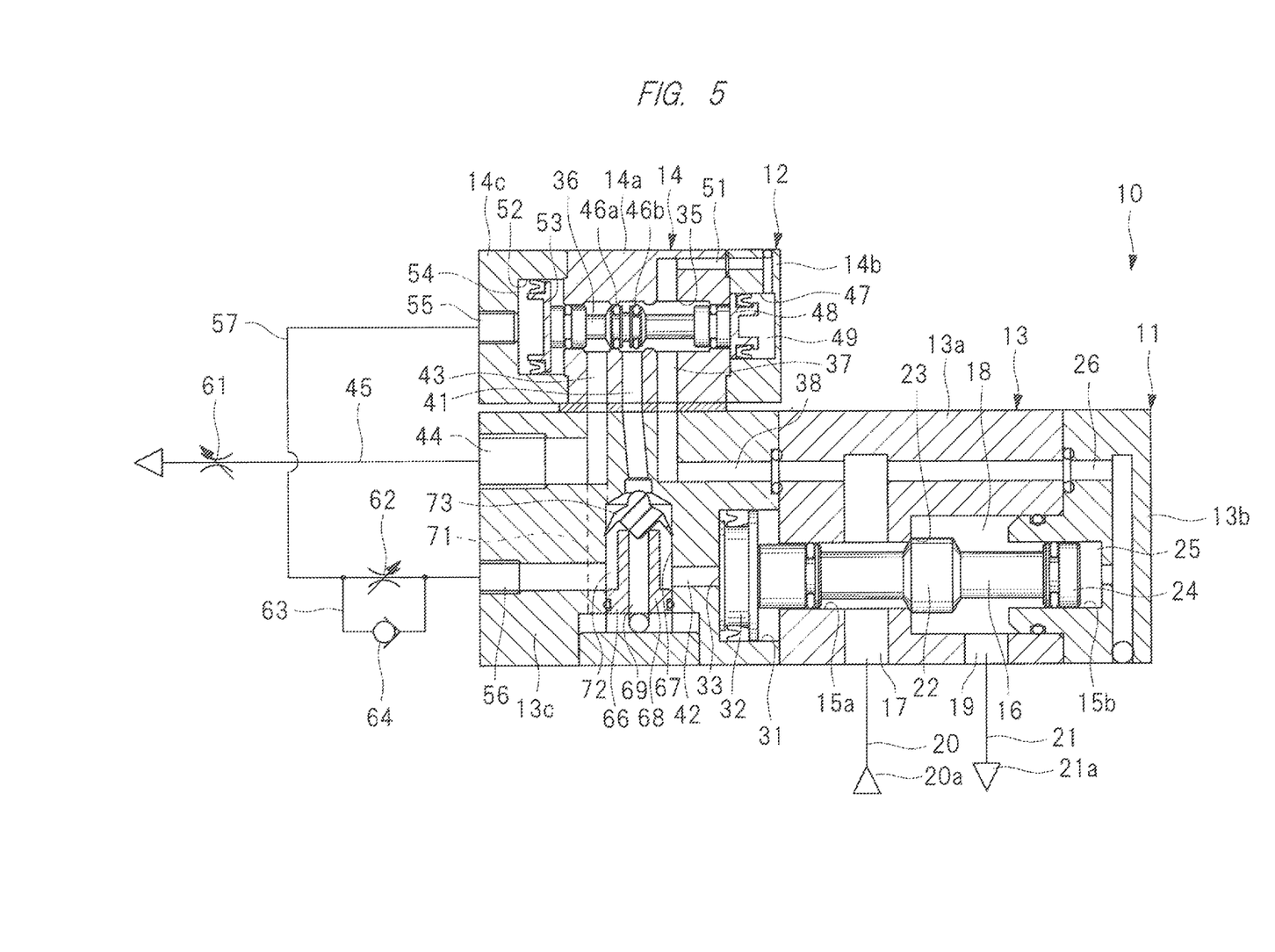
FIG. 5 is a cross-sectional view showing an intermittent air discharge apparatus according to another embodiment of the present invention.
Figure 6:
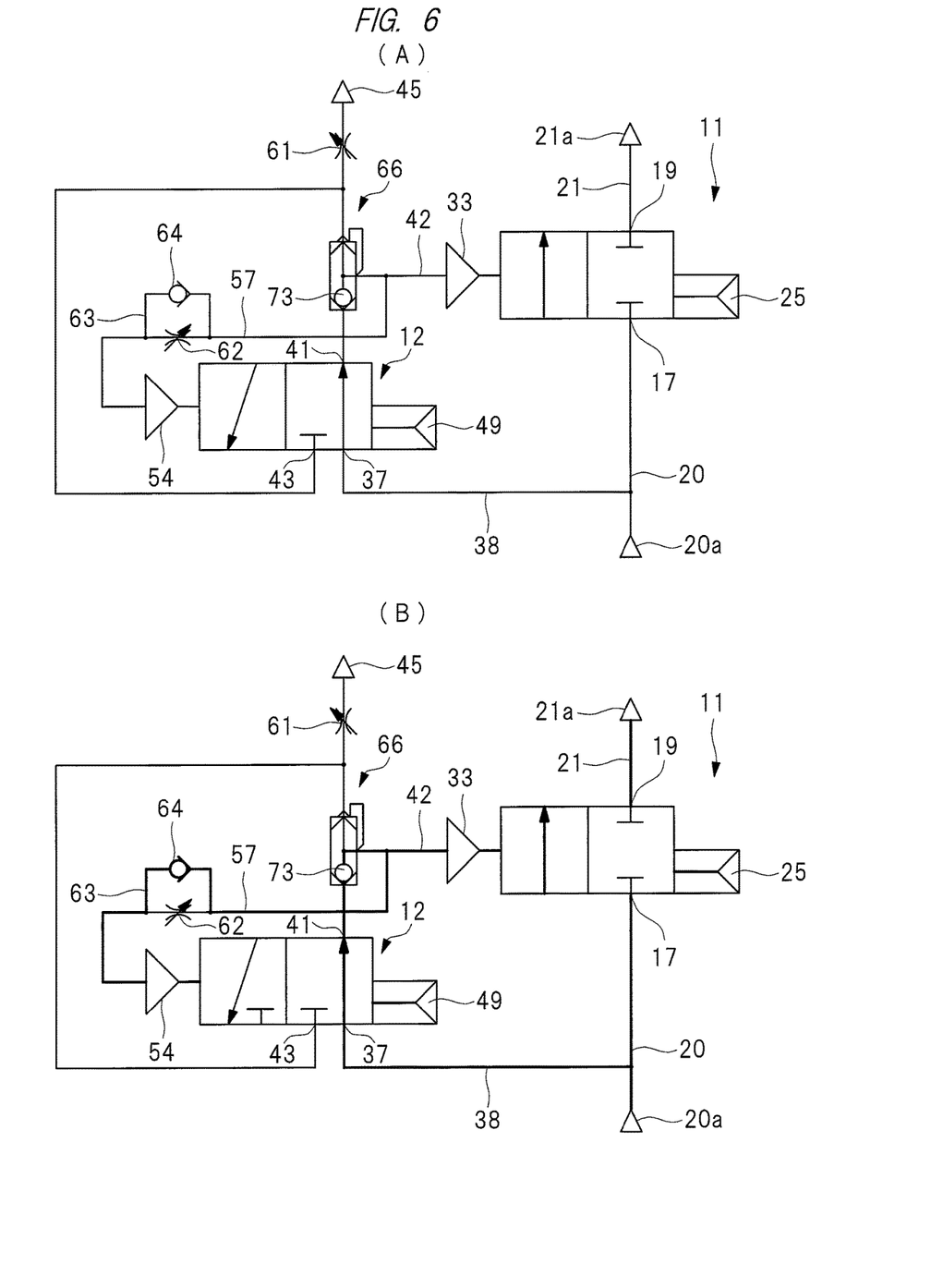
FIG. 6(A) is a pneumatic circuit diagram of the intermittent air discharge apparatus of FIG. 5.
FIG. 6(B) is a pneumatic circuit diagram showing the intermittent air discharge apparatus of FIG. 5 at the start of air discharge.

FIG. 5 is a cross-sectional view of an intermittent air discharge apparatus according to another embodiment. In FIG. 5, components the same as those shown in FIG. 1 are referred to by identical reference numerals, and descriptions thereof are omitted as appropriate.

This intermittent air discharge apparatus 10 includes a rapid exhaust valve 66 incorporated in a pilot block 13c. The rapid exhaust valve 66 has a valve seat sleeve 68, and the valve seat sleeve 68 is fitted in a valve element housing hole 67 formed in the pilot block 13c. The valve seat sleeve 68 is provided with a communication hole 69 which communicates with an exhaust passage 45 through a communication passage 71 formed in the pilot block 13c. A communication space 72 formed between the valve seat sleeve 68 and the valve element housing hole 67 communicates with a pilot chamber 33 for air-discharge and a supply or exhaust passage 57.

An exhaust valve element 73 made of rubber is fitted in the valve element housing hole 67. When air is supplied from an output port 41, the exhaust valve element 73 is moved to abut on a valve seat surface on a front end of the valve seat sleeve 68 to close the communication hole 69. At this time, the rapid exhaust valve 66 communicates with the output port 41 and the pilot chamber 33 for air-discharge through an opening formed between the valve element housing hole 67 and an outer peripheral edge of the exhaust valve element 73. As a result, air in the air supply port 37 is supplied to the pilot chamber 33 for air-discharge. On the other hand, when the output port 41 and the air supply port 37 are blocked from communicating with each other, a pressure of compressed air in the pilot chamber 33 for air-discharge causes the exhaust valve element 73 to move away from the valve seat surface of the valve seat sleeve 68. As a result, the output port 41 and the pilot chamber 33 for air-discharge are blocked from communicating with each other, while the pilot chamber 33 for air-discharge communicates with the exhaust passage 45 and the supply or exhaust passage 57 through the communication hole 69.

Figure 7:
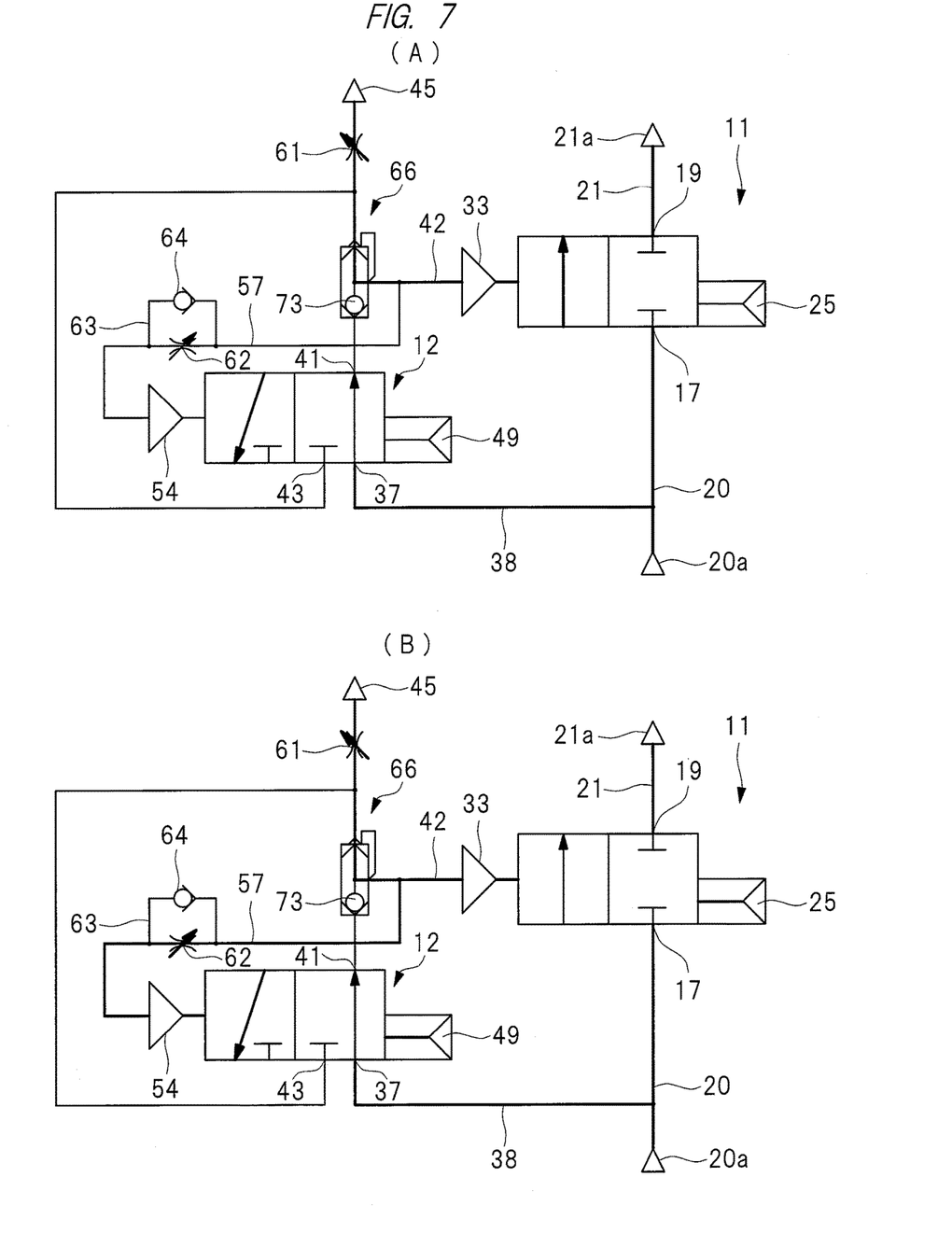
FIG. 7(A) is a pneumatic circuit diagram showing the intermittent air discharge apparatus of FIG. 6 with air discharged.
FIG. 7(B) is a pneumatic circuit diagram showing the intermittent air discharge apparatus of FIG. 6 with air discharge stopped.

FIGS. 6(A) to 7(B) are pneumatic circuit diagrams of the intermittent air discharge apparatus of FIG. 5. FIG. 6(B) shows the intermittent air discharge apparatus at the start of air discharge, FIG. 7(A) shows the intermittent air discharge apparatus with air discharged, and FIG. 7(B) shows the intermittent air discharge apparatus with air discharge stopped. In FIGS. 6(A) to 7(B), components the same as those shown in FIG. 5 are referred to by identical reference numerals. As shown in FIGS. 6(B), 7(A), and 7(B), flow directions of air are indicated by thick lines.

As compressed air is supplied from a fluid supply source 20a to the air supply port 17, compressed air is supplied to a pilot chamber 25 for stopping air-discharge and a pilot chamber 49 for air-supply. As compressed air is supplied to the pilot chamber 49 for air-supply, air is supplied to the pilot chamber 33 for air-discharge through a pilot valve 12 set to its air-supply position, and as a result, a main valve 11 is switched to the discharge state, as shown in FIG. 6(B). Compressed air is supplied through a discharge passage 21 and is discharged, as shown in in FIG. 6(B) in which flow directions of air are indicated by thick lines. In FIG. 4, "t1" indicates a point of time at which the main valve 11 is switched to the discharge state.

As air is discharged through the discharge passage 21, air is supplied to a pilot chamber 54 for stopping air-supply through a bypass passage 63 of the supply or exhaust passage 57, and the pilot valve 12 is switched to an air-supply stop state. Discharging of air through the discharge passage 21 is started approximately at the same time the pilot valve 12 is switched to the air-supply stop state. In this state, compressed air in the fluid supply source 20a is stopped from being supplied to the pilot chamber 33 for air-discharge. As a result, the exhaust valve element 73 of the rapid exhaust valve 66 is moved away from the valve seat sleeve 68 by compressed air flowing out from the pilot chamber 33 for air-discharge, the pilot chamber 33 for air-discharge communicates with the exhaust passage 45 through the rapid exhaust valve 66 and the communication passage 71, and compressed air in the pilot chamber 33 for air-discharge is exhausted. FIG. 7(A) shows the intermittent air discharge apparatus 10 exhausting compressed air in the pilot chamber 33 for air-discharge to the outside through the exhaust passage 45. A period in which compressed air is exhausted from the pilot chamber 33 for air-discharge corresponds to a period "T1" in which compressed air is discharged through the discharge passage 21, as shown in FIG. 4. The period "T1" is determined by a flow rate of air exhausted through the exhaust passage 45, wherein this flow rate of air is set by a first variable throttle valve 61, as in the case of the intermittent air discharge apparatus 10 of FIG. 1.

As air in the pilot chamber 33 for air-discharge is exhausted, the main valve 11 is switched to the discharge stop state by air in the pilot chamber 25 for stopping air-discharge, as shown in FIG. 7(B). As a result, the discharge passage 21 and the air supply passage 20 are blocked from communicating with each other, and air is stopped from being discharged through the discharge passage 21. "t2" in FIG. 4 indicates a point of time at which air is stopped from being discharged through the discharge passage 21.

In this manner, compressed air is exhausted from the pilot chamber 33 for air-discharge, the main valve 11 is switched to the discharge stop state, and the pilot valve 12 is switched from the air-supply stop state to the air-supply state. A period in which compressed air is exhausted from the pilot chamber 54 for stopping air-supply corresponds to a discharge-stop period "T2" of FIG. 4. The discharge-stop period "T2" is determined by a flow rate of air exhausted from the pilot chamber 54 for stopping air-supply to the outside through the supply or exhaust passage 57, the rapid exhaust valve 66, the communication passage 71, and the exhaust passage 45, wherein this flow rate of air is set by the variable throttle valves 61 and 62. As air is exhausted from the pilot chamber 54 for stopping air-supply, the pilot valve 12 is switched to the air-supply state by compressed air in the pilot chamber 49 for air-supply. After the pilot valve 12 is switched to the air-supply state, the main valve 11 is switched to the discharge state, as shown in FIG. 6(B).

In this manner, periods in which compressed air is discharged and periods in which compressed air is stopped from being discharged are alternately repeated, resulting in intermittent discharging (discharge pressure pulsation) of compressed air through the discharge passage 21. In the same manner as the intermittent air discharge apparatus 10 of FIG. 1, a duty ratio "D" of the discharge period for compressed air is determined by the flow rate of air exhausted from the pilot chamber 54 for stopping air-supply, wherein this flow rate of air is set by an opening angle of the second variable throttle valve 62. A frequency "F" of pulsatively discharged compressed air is determined by the flow rate of compressed air exhausted through the exhaust passage 45, wherein this flow rate of compressed air is set by the first variable throttle valve 61.

According to the embodiment shown in FIG. 1, air is exhausted from the pilot chamber 33 for air-discharge and the pilot chamber 54 for stopping air-supply through the pilot valve 12. According to the embodiment of FIG. 5, air in the pilot chamber 33 for air-discharge and the pilot chamber 54 for stopping air-supply are exhausted through the rapid exhaust valve 66. In the embodiment of FIG. 5, since air in the pilot chamber 33 and the pilot chamber 54 is exhausted without passing through the pilot valve 12, a two-port valve identical in structure with the main valve 11 can be used instead of the pilot valve 12.

Figure 8:
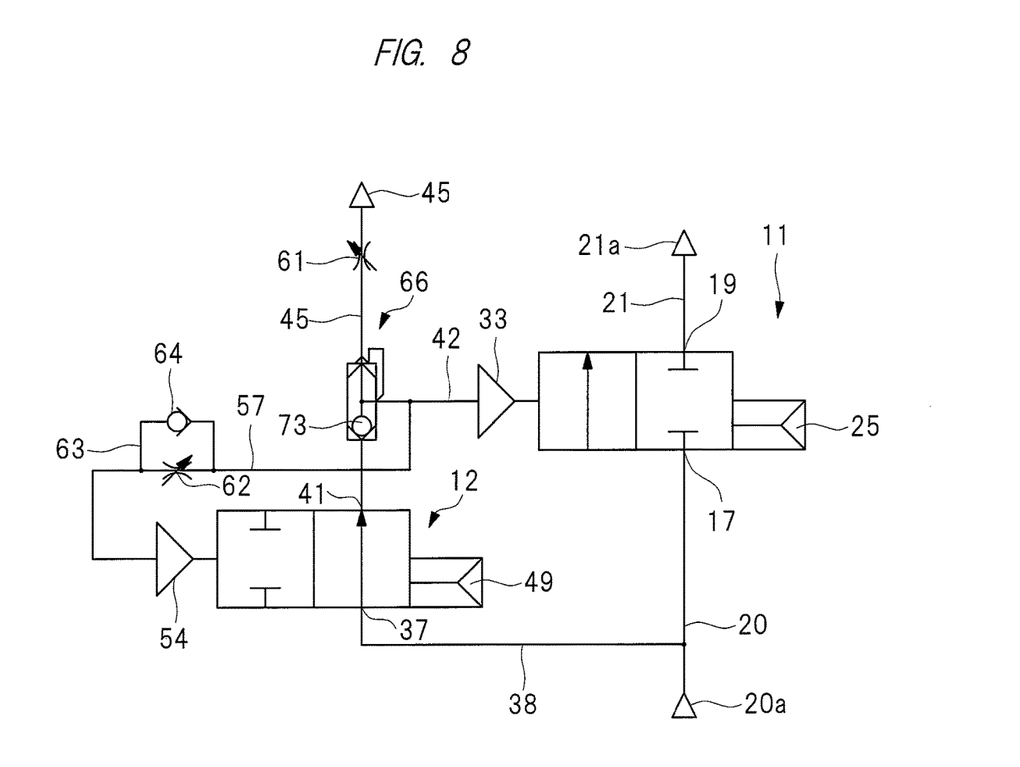
FIG. 8 is a pneumatic circuit diagram of the intermittent air discharge apparatus according to still another embodiment of the present invention.

FIG. 8 is a pneumatic circuit diagram of an intermittent air discharge apparatus according to still another embodiment. This intermittent air discharge apparatus 10 is provided with the above-mentioned two-port valve as the pilot valve 12, as shown in FIG. 5. According to this embodiment, flow directions of air are the same as those shown in FIGS. 6(A), 6(B), 7(A) and 7(B).

Figure 9:
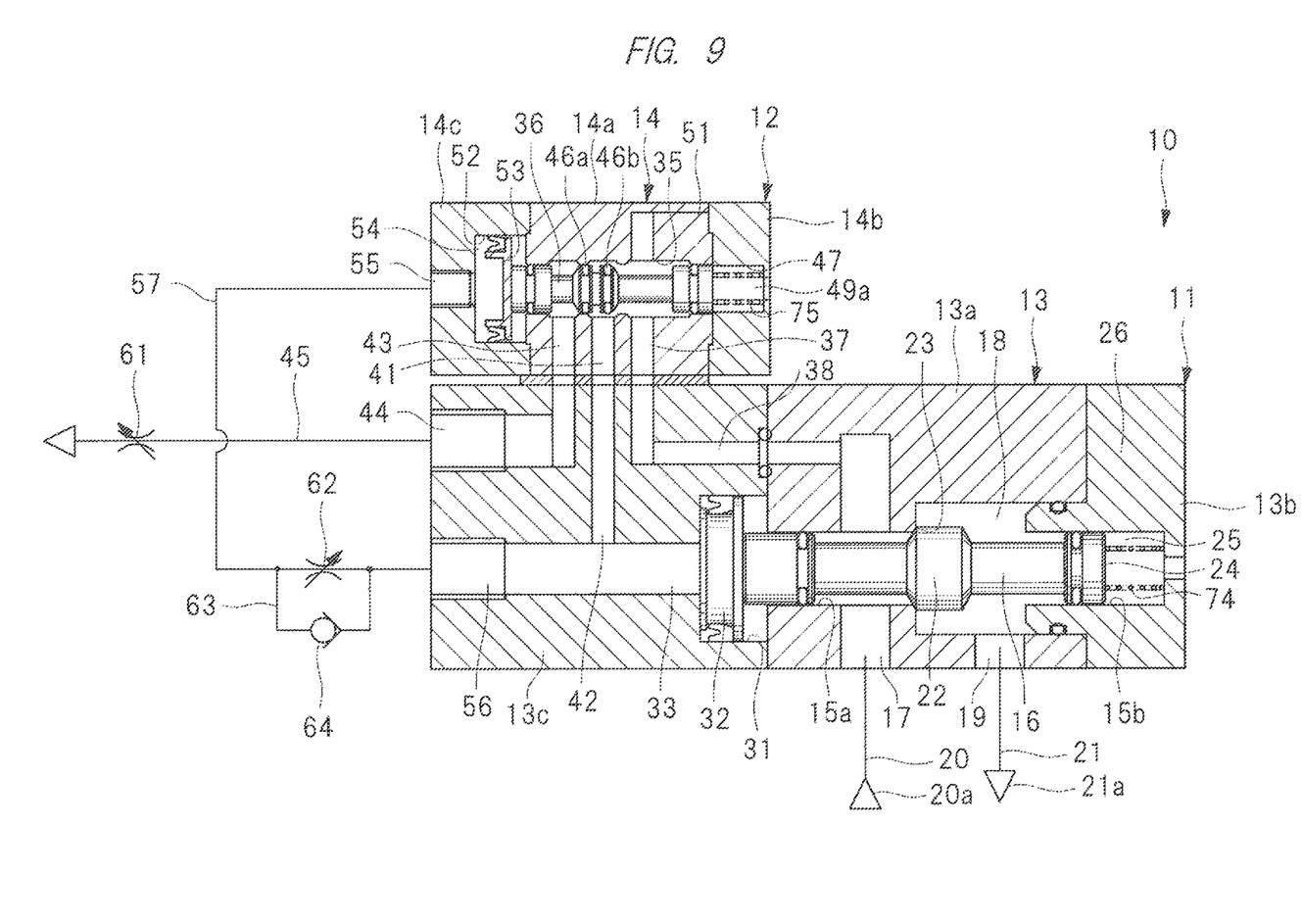
FIG. 9 is a cross-sectional view showing an intermittent air discharge apparatus according to still another embodiment of the present invention.

The present invention is not limited to the above-mentioned embodiments, and can be various modified without departing from the scope of the invention. For example, the first variable throttle valve provided in the exhaust passage 45 and the second variable throttle valve provided in the supply or exhaust passage 57 may be replaced with fixed throttle valves; in another case, no throttle valve may be provided, and instead, the exhaust passage 45 and the supply or exhaust passage 57 may have appropriate inner diameters. According to the above-mentioned embodiments, the main valve 11 is provided with the pilot chamber 25 for stopping air-discharge, and the pilot valve 12 is provided with the pilot chamber 49 for air-supply. However, as shown in FIG. 9, the pilot chamber 25 for stopping air-discharge of the main valve 11 may be provided with a compression coil spring 74 to replace compressed air constantly supplied to the pilot chamber 25 for stopping air-discharge. In the same manner, the pilot chamber 49 for air-supply of the pilot valve 12 may be provided with a compression coil spring 75 to replace compressed air constantly supplied to the pilot chamber 49 for air-supply.

This invention is applicable to a field of techniques for pulsatively sending compressed air to an object.

Although various embodiments of the present invention have been described and shown, the invention is not restricted thereto, but may also be embodied in other ways within the scope of the subject-matter defined in the following claims.

What is claimed is:

1. An intermittent air discharge apparatus which intermittently discharges supplied compressed air, comprising:
   a main valve having: a first pilot chamber; a first air supply port through which compressed air is supplied; and a discharge port through which compressed air is discharged, the main valve being operated to be switched between: a discharge state allowing the first air supply port to communicate with the discharge port; and a discharge stop state blocking the first air supply port and the discharge port from communicating with each other;
   a pilot valve connected in operative relationship with the main valve, and having:
   a second pilot chamber;
   a second air supply port communicating with the first air supply port;
   an output port communicating with the first pilot chamber; and
   a exhaust port communicating with an exhaust passage through which compressed air is discharged to the outside;
   the pilot valve being operated to be switched between: an air-supply state allowing the second air supply port and the output port to communicate with each other, and blocking the exhaust port and the output port from communicating with each other, and an air-supply stop state blocking the second air supply port and the output port from communicating with each other, and allowing the exhaust port and the output port to communicate with each other; and
   a supply or exhaust passage through which the second pilot chamber communicates with the output port,
   whereby when the pilot valve is switched to the air-supply state, the pilot valve allows the second air supply port to communicate with the second pilot chamber, and after compressed air is supplied to the second pilot chamber through the second air supply port, the pilot valve reaches the air-supply stop state, and
   when the pilot valve is switched to the air-supply stop state, the pilot valve allows the second pilot chamber to communicate with the exhaust passage, and after compressed air is discharged from the second pilot chamber, the pilot valve reaches the air-supply state.

2. The intermittent air discharge apparatus according to claim 1, which further comprises a throttle valve provided in the exhaust passage.

3. The intermittent air discharge apparatus according to claim 2, wherein the throttle valve is a variable throttle valve which is operated to change a flow rate of air.

4. The intermittent air discharge apparatus according to claim 1, which further comprises a second throttle valve provided in the supply or exhaust passage.

5. The intermittent air discharge apparatus according to claim 4, which further comprises:
   a bypass passage provided in the supply or exhaust passage and passes around the throttle valve; and
   a check valve provided in the bypass passage,
   wherein the check valve is operated to open the bypass passage when compressed air in the first air supply port is supplied to the second pilot chamber, and to close the bypass passage when compressed air in the second pilot chamber is exhausted through the exhaust passage.

6. The intermittent air discharge apparatus according to claim 4, wherein the throttle valve is a variable throttle valve which is operated to change a flow rate of air.

7. The intermittent air discharge apparatus according to claim 1, which further comprises a rapid exhaust valve, wherein
   the rapid exhaust valve is operated to allow the first air supply port to communicate with the first pilot chamber and the supply or exhaust passage when the pilot valve is switched to the air-supply state, and
   the rapid exhaust valve is operated to exhaust air in the first pilot chamber to the outside through the exhaust passage, and to exhaust air in the second pilot chamber to the outside through the supply or exhaust passage and the exhaust passage when the pilot valve is switched to the air-supply stop state.

8. The intermittent air discharge apparatus according to claim 1, wherein the pilot valve comprises a fourth pilot chamber which communicates with the second air supply port, the pilot valve being switched to the air-supply state by air in the fourth pilot chamber when air is exhausted from the second pilot chamber.

9. The intermittent air discharge apparatus according to claim 8, wherein the pilot valve further comprises:
   third piston which partitions the second pilot chamber; and
   a fourth piston which partitions the fourth pilot chamber, the third piston having an outer diameter greater than that of the fourth piston.

10. The intermittent air discharge apparatus according to claim 1, wherein the main valve comprises a third pilot chamber which communicates with the first air supply port, the main valve being switched to the discharge stop state by air in the third pilot chamber when air is exhausted from the first pilot chamber.

11. The intermittent air discharge apparatus according to claim 10, wherein the main valve further comprises:
   a first piston which partitions the first pilot chamber; and
   a second piston which partitions the third pilot chamber, the first piston having an outer diameter greater than that of the second piston.

\* \* \* \* \*